(12) United States Patent
Poonen et al.

(10) Patent No.: US 10,243,804 B2
(45) Date of Patent: Mar. 26, 2019

(54) CONTINUOUS DELIVERY OF HIERARCHICAL PRODUCTS USING EXECUTOR FOR SOFTWARE CONFIGURATION AUTOMATION

(71) Applicant: Oracle International Corporation, Redwood Shores, CA (US)

(72) Inventors: Santosh Poonen, Redwood Shores, CA (US); Qiang Zhang, Redwood Shores, CA (US); Shengming Yu, Redwood Shores, CA (US); Qiuxia Han, Redwood Shores, CA (US); Chenghao Shi, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 200 days.

(21) Appl. No.: 15/445,676

(22) Filed: Feb. 28, 2017

(65) Prior Publication Data
US 2018/0083840 A1 Mar. 22, 2018

Related U.S. Application Data

(60) Provisional application No. 62/396,007, filed on Sep. 16, 2016.

(51) Int. Cl.
| | | |
|---|---|---|
| G06F 15/173 | (2006.01) | |
| H04L 12/24 | (2006.01) | |
| G06F 8/71 | (2018.01) | |
| G06F 8/61 | (2018.01) | |
| G06F 9/445 | (2018.01) | |

(52) U.S. Cl.
CPC ............... *H04L 41/12* (2013.01); *G06F 8/61* (2013.01); *G06F 8/71* (2013.01); *G06F 9/44505* (2013.01); *H04L 41/0886* (2013.01)

(58) Field of Classification Search
USPC ....... 709/203, 206, 217, 219, 223, 224, 226, 709/228, 230, 232, 238; 707/812; 705/7.11; 1/1
See application file for complete search history.

(56) References Cited

U.S. PATENT DOCUMENTS

| | | | |
|---|---|---|---|
| 7,957,991 B2 * | 6/2011 | Mikurak | G06Q 10/06 705/7.11 |
| 2013/0086130 A1 * | 4/2013 | Wang | G06F 8/60 707/812 |
| 2017/0149681 A1 * | 5/2017 | Chen | H04L 41/12 |

* cited by examiner

*Primary Examiner* — Quang N Nguyen
(74) *Attorney, Agent, or Firm* — Miller Nash Graham & Dunn LLP

(57) ABSTRACT

A distributed topology system may include a distributed topology engine configured to run on a server device and define a topology consisting of one or more building blocks. Each building block may represent one or more tasks pertaining to an application. The system may also include a distributed topology application configured to run on a client device and automatically execute one or more of the building blocks. A distributed topology database may be used to store the topology. A continuous integration module may be configured to validate at least one product change and, responsive to a successful validation, promote the at least one product change.

20 Claims, 13 Drawing Sheets

200

Select Import Parameter

Select Block

Select Block Export Param.

| Show all Export Parameters | Reset above selection | Select | |
|---|---|---|---|
| Import Parameter | Value | | Description |
| PLATFORM | %PLATFORM% | | The value should be %PL |
| HOSTNAME | %HOST% | | The name of the host on |
| SHIPHOME | %SHIPHOME_RDBMS_11.2.0.1.0% | | The shiphome location for |
| ORACLE_HOME | %OH% | | The ORACLE_HOME locat |
| ORACLE_HOME_NAME | %OHN% | | The ORACLE_HOME_NA |
| INVENTORY_LOC | %INVLOC% | | The inventory location us |
| ORACLE_SID | %SID% | | The Database SID for this |
| GLOBAL_DB_NAME | %GDBNAME% | | The Global Database Nam |
| INSTALL_TYPE | EE | | Valid install types are : EE |
| DB_CHARSET | AL32UTF8 | | The database charater s |
| DB_PORT | %DB_PORT% | | The database listener po |
| SYS_PASSWORD | welcome1 | | The common password to |
| SOFTWARE_ONLY | true | | Whether the install lays o |

FIG. 2

```
bash-4.1$ ls -ltra
total 20
drwxrwxrwx   3 cheshi dba  4096 Jan 22 11:54 ::
drwxrwxrwx   1 cheshi dba   127 Jan 22 12:02 .dte_snapshot
drwxrwxrwx   4 cheshi dba  4096 Jan 22 12:02 .
drwxrwxrwx  11 cheshi dba  4096 Jan 22 12:02 DTE
drwxrwxrwx   6 cheshi dba  4096 May 31 11:08 database
bash-4.1$ more .dte_snapshot
SNAPSHOT_NAME=DTE-SNAPSHOT-20160122.115423
SNAPSHOT_OWNER=cheshi
DTE_VERSION=DTE
AUTOCHDIR_MODE=PARTIAL
PRODUCT=foo
RELEASE=bar
bash-4.1$ pwd
/scratch/cheshi/sysnapshot/DTE-SNAPSHOT-20160122.115423
```

FIG. 8

CONTINUOUS DELIVERY OF HIERARCHICAL PRODUCTS USING EXECUTOR FOR SOFTWARE CONFIGURATION AUTOMATION

CROSS REFERENCE TO RELATED APPLICATIONS

This application claims priority to and the benefit of U.S. Provisional Patent Application No. 62/396,007, titled "CONTINUOUS DELIVERY OF HIERARCHICAL PRODUCTS USING EXECUTOR FOR SOFTWARE CONFIGURATION AUTOMATION" and filed on Sep. 16, 2016, which is hereby incorporated herein in its entirety.

BACKGROUND

In today's software research and development organizations, an incredible amount of time and resources is typically required in setting up a working environment, which typically includes multiple machines and devices that are networked together and configured to run various software applications and suites that span across the machines and possibly other devices. A proper setup of a working environment typically requires the individual configuration of numerous software components that together form a complex interdependent network of machinery and software installations, but there are various problems associated with setting up these environments. For example, users typically need to learn how to configure each software component in the technology stack but most of those installs may actually be outside their areas of expertise.

The existence of numerous input values and pre-configuration requirements for underlying installations increases the possibility of typographic or misconfiguration errors by a user. Even if the user was somewhat familiar with how to configure the underlying software, a simple user input or configuration error at some point along the way might manifest itself only much later in the technology stack, thereby resulting in a potentially tremendous waste of time.

Human limitations often force some processes to be linear even though some of them might be able to be parallelized with automated software to increase efficiency. Even if the environment can be distributed so that various independent tasks can be executed simultaneously across different machines, though, the user is typically limited to being able to only perform one configuration task at a time.

The manual configuration of specialized environments is usually dependent on individuals who have specific knowledge about those configurations. Should the user be unavailable at any point during the process, all of the knowledge acquired by that user with regard to the setup of the environment would automatically become unavailable. In most cases, users do not want to set up a configuration on their own personal machines but on some other machine of their choosing. However, current frameworks do not allow for remote machines to be used for the execution nor do they provide active communication with these remote machines. Thus, users are typically required to constantly monitor the execution of the associated topology, which provides the pertinent configuration specifications, in setting up the environment.

Current frameworks do not allow for proper exiting from all relevant tasks, let alone reporting of the success or failure of those tasks. Users often desire to trigger a run of their topologies without human intervention so that results are available upon their return, but current frameworks do not allow for scheduling of the execution of topologies at any given time. Also, current frameworks do not allow for a predefined selection of topologies to be executed simultaneously based on the user's selection, nor do they effectively indicate whether the set up of a particular software configuration has been validated and certified.

Accordingly, there remains a need for a way to address these and other deficiencies associated with the prior art.

BRIEF DESCRIPTION OF THE DRAWINGS

FIG. 2 illustrates an example of a building block interface in accordance with certain implementations of the disclosed technology.

FIG. 8 illustrates an example of a screenshot in accordance with certain implementations of the disclosed technology.

DETAILED DESCRIPTION

As used herein, a topology generally refers to a set of configuration specifications for a working environment. A topology may include, for example, a mapping of physical and/or logical connections between nodes, such as computers or other electronic machines or devices in the environment, and individual requirements or preferences for any or all of the individual nodes or other components of the environment. A topology may also include various settings and parameters for software programs and/or suites that are to be used on, within, or in connection with the environment.

A topology in accordance with the disclosed technology generally includes multiple building blocks or "mini programs," which generally represent programs that are designed to install and/or configure relatively small portions, sub-parts, or aspects of the environment, such as a database or certain portions or characteristics of the database. Execution of a topology generally refers to the setting up of the environment by executing each of the associated building blocks in accordance with the topology.

The disclosed technology generally pertains to a distributed topology environment (DTE) framework that may be used to provide users with the ability to automatically configure complex software programs. The disclosed DTE framework may provide a Software-as-a-Service (SaaS) solution that may be leveraged to enable companies or individual users to quickly create reproducible environments of complex software installations. Certain implementations of this automation framework incorporate multiple layers of cloud computing in delivering solutions as an integrated service to end users.

The DTE framework may also allow for debugging and quality assurance testing of such installations, providing companies and users with significant savings in time and resources, particularly with regard to development groups, quality assurance teams, and support staff members. Such realized improvements in development and quality assurance typically result in a streamlining of the code approval process because changes in code may be immediately verified in valid customer scenarios before being introduced into the pertinent product(s).

Embodiments of the DTE framework described herein generally conform to the model of cloud computing in providing a service for the automated configuration of software in a simple and easily understood way without requiring that its users have knowledge of how the service is provided. Whereas certain tasks have been previously automatable, such as certain installs and quality assurance test suites, for example, current systems do not provide complete automation of such tasks from start to finish without requiring some type of manual intervention between tasks. Implementations of the DTE framework, however, generally allow for full testing against valid customer-specific configurations.

Figure 1:
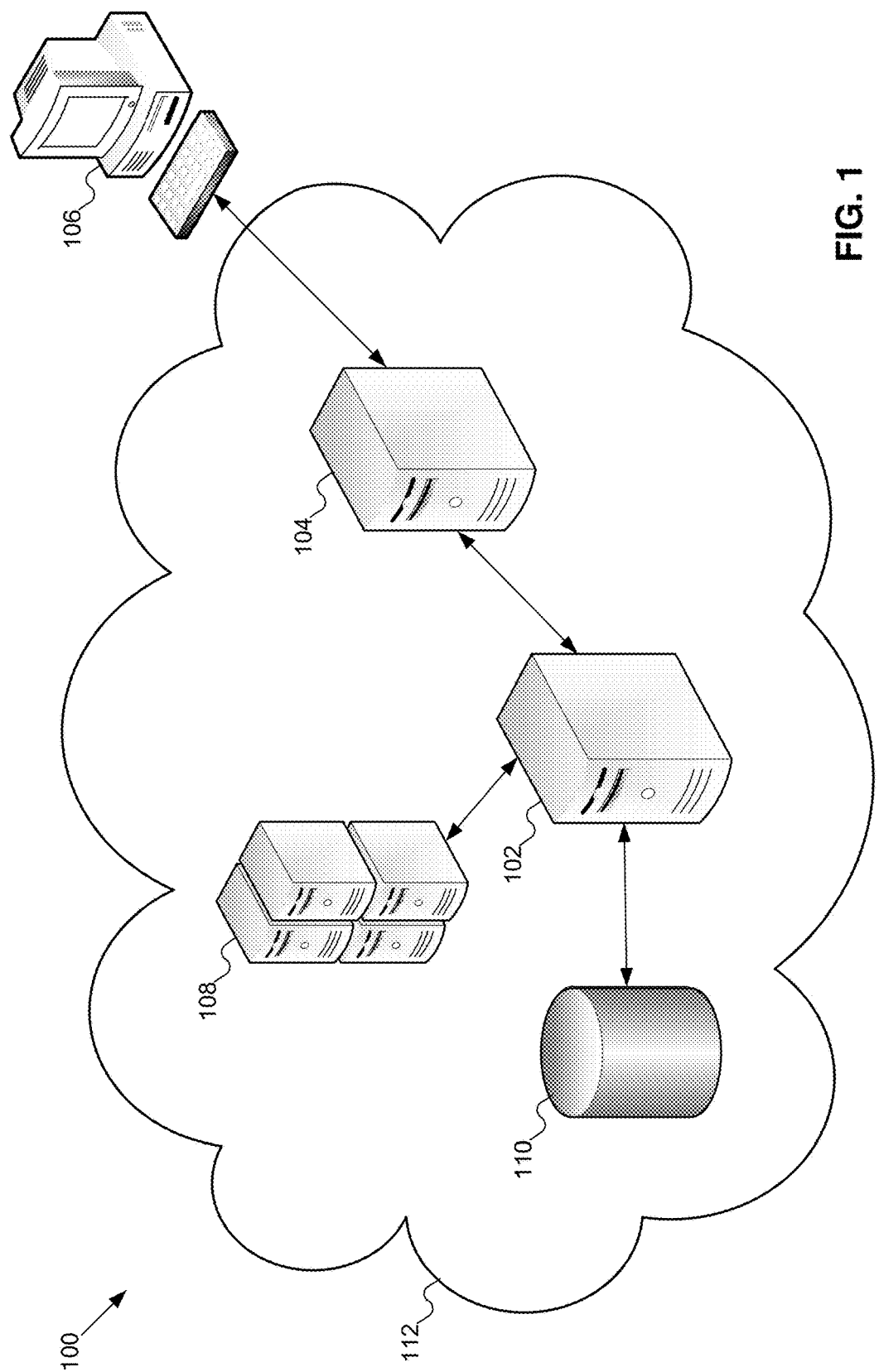
FIG. 1 illustrates an example of a networked system in which embodiments of the disclosed technology may be implemented.

FIG. 1 illustrates an example of a networked system 100 in which embodiments of the disclosed technology may be implemented. A DTE framework as illustrated in FIG. 1 may be effected by multiple applications spanning multiple devices, some or all of which may be referred to as being in the cloud. Such arrangements are generally referred to as cloud computing. In these scenarios, the DTE framework described herein may allow for automated installation and configuration of software products delivered to customers as a SaaS solution.

The system 100 includes a DTE engine 102 that may be implemented on or in connection with a single device such as a central server, for example. The DTE engine 102 may drive a DTE application 104 that may be implemented on or in connection with a webserver, for example. A client device 106, such as an individual user's computer, for example, may interact with the DTE engine 102 through the DTE application 104. In the example, the DTE engine 102 also interacts with, e.g., drives and/or receives information from, one or more execution machines 108.

The DTE engine 102 may interact with a data store 110 that may be implemented as a database on the same machine as the DTE engine 102 or on a separate machine that may be situated remotely from the machine on which the DTE engine 102 primarily resides. The data store 110 may be configured to store building blocks, topology specifications, topology libraries, or any combination thereof. In alternative embodiments, the DTE engine 102 may interact with several data stores that each pertain to different topologies, building blocks, etc.

Embodiments of the DTE framework described herein generally include a thin client-side application or suite of applications configured to communicate with a central server that primarily drives the DTE framework. When used in conjunction with a designated pool of machines, the DTE framework may provide an entire platform and infrastructure as a service. Such implementations may be deployed and scaled across virtually any operating system.

Embodiments of the DTE framework may allow users to create and save mini-programs configured to perform specific tasks based on provided input parameters. The DTE framework may then allow for these tasks to be integrated together into a topology by way of exchanging useful information among the various tasks. In this way a complex install environment can be configured accurately, effectively, and efficiently.

A user may create certain individual tasks or building blocks that may continue to be owned by the block creator but may also be utilized by any other user in connection with the DTE framework to set up different personalized configurations. A building block generally represents a relatively simple task in a computer work-flow process and may include a silent product install task, a silent product configuration task, a test driving task, a script execution task, or virtually any other type of task that may be performed in an automated manner. Building blocks may be tailored for use with a particular product install process, for example. Building blocks may also be shared with others and, in some embodiments, may be certified for such reuse. A building block as described herein generally includes two components: a building block definition, e.g., an XML, definition, and building block logic, e.g., an executable script.

FIG. 2 illustrates an example of a building block interface 200 in accordance with certain implementations of the disclosed technology. The building block interface 200 may be implemented as a web-based application and may provide a graphical user interface (GUI) having multiple tabs such as "Create Building Block," "Edit Building Block," "Building Block Details," "Test Building Block," etc. The "Building Block Details" tab may result in the presentation of a building block details page from which a user may cause a script, such as a Perl script, to be generated on the browser to be saved locally, for example. The "Test Building Block" tab may result in the presenting of a test building block page from which the user may test the selected building block locally, e.g., before saving the building block or making it available to other users.

In the illustrated example, a number of import parameters associated with building block DATABASE1 are displayed along with their corresponding values and descriptions. The import parameters that may be specified for a particular building block may include, but are not limited to, the associated platform, a name of the host on which a database is to be installed, a name of the associated database, and a password, for example. Output parameters of a building block may include, but are not limited to, the execution outcome of a task, e.g., SUCCESS or FAILURE, the host name where the database was installed, and the database listener port number and/or service name (if successful).

A building block in accordance with the DTE framework described herein may be characterized at least in part by the following pseudo-code:

- procedure read_importfile
    read input file containing user-specific parameter values
- procedure read_runtimefile
    read text file containing environment-specific parameter values
- procedure execute_task
    perform task (install, test, etc.)
- procedure write_exportfile
    write output file containing install-specific information Consider an example in which experts of a particular software application or suite may create one or more building blocks specifically tailored for their software. Other users, who may not have similar expertise with this the software, can safely use the pre-made building blocks without having to learn the details of the specific software configuration. For example, a database install expert may create a particular database install block (e.g., DATABASE1 of FIG. 2) that uses a certain installer to automatically configure the database. A script may be used to populate a response file for the install by instantiating relevant values that the user has provided to the building block(s) and, in the case of unspecified parameters during the install, selecting or determining default values for the unspecified parameters.

Upon completion of a certain task during install, information generated by the task itself may be made available to other building blocks in the DTE framework that might benefit from or need such information. In this way, a user who needs the particular database install in his or her environment but is not familiar with the details of the specific configuration may simply use the predefined DATABASE1 install block in the new topology.

DTE framework building blocks may each read input parameters from text files that are generated by the framework based on how that particular building block is defined in the framework. As noted above, a building block may populate a file containing values that other building blocks in the topology may need upon completion of the associated task. Since these values may be saved into files for repeated usage by building blocks the possibility of typographical errors in the input values may be drastically reduced, if not eliminated entirely.

In certain embodiments, two or more building blocks may be arranged together into one or more particular topologies according to the specifications of the environment. These topologies, while typically owned by the creator, may be utilized by virtually any other user in the DTE framework. The topologies can execute independent tasks simultaneously across various machines. That is, the DTE framework may spawn a process to execute a first task and, if a second task is not dependent on the first, the DTE framework may spawn a process to execute the second task simultaneously. These tasks may be on the same hardware resource or on different hardware resources, resulting in significant execution time savings during the set up of the desired configuration.

Figure 3:
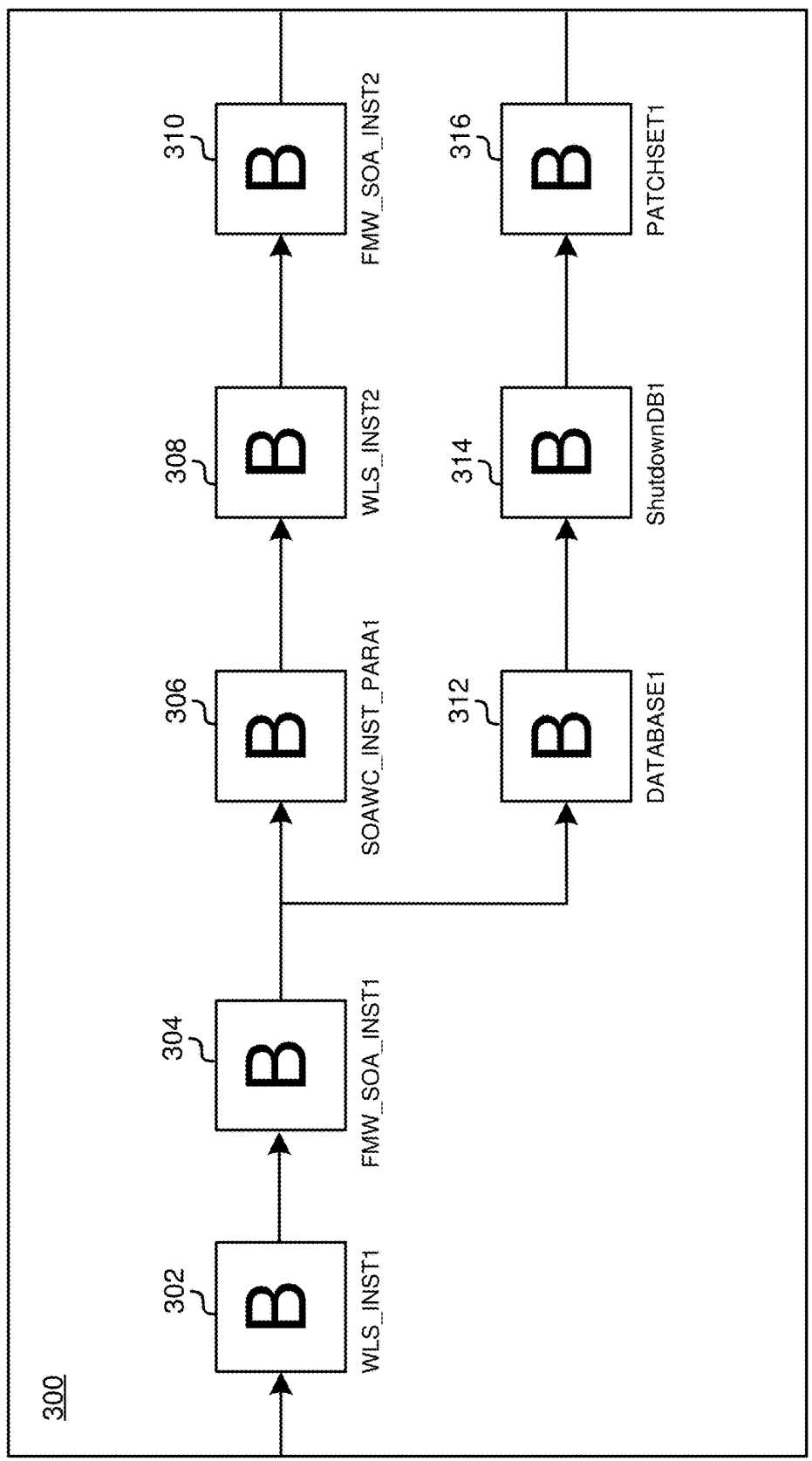
FIG. 3 illustrates an example of a topology creator interface in accordance with certain implementations of the disclosed technology.

FIG. 3 illustrates an example of a topology creator interface 300 in accordance with certain implementations of the disclosed technology. In the example, a number of building blocks 302-316 have been selected as part of the topology being created. The building blocks may be arranged in virtually any order and combination, depending on the desired resulting configuration upon execution of the topology. One of the building blocks (312) in the example is the building block DATABASE1 of FIG. 2. Once the topology creator is satisfied with the topology, he or she may save the topology. The topology may be saved locally, at remote storage (such as a central server or database), or both.

The illustrated example indicates that, when the topology is executed, building block 302 is to be executed before any of the other building blocks 304-316. Once the second building block 304 has executed, however, parallel execution may begin in accordance with a branching structure of the topology. More specifically, building blocks 306 and 312 may be executed concurrently. Building blocks subsequent to 306 and 312, e.g., 308-310 and 314-316, respectively, may be executed concurrently or dependent upon other factors as specified by the topology creator.

In certain embodiments, the DTE framework may allow creators or administrators to define certified topologies. Certified topologies generally refer to topologies that have been validated and certified for use in connection with the specific configurations that they are primarily intended to address. Certified topologies may be released to customers along with corresponding software, for example. In such scenarios, a certified topology may be enable the customer to install and configure the product in an automated and efficient manner with a significant reduction in—or even complete elimination of—errors that might otherwise be manifested during an installation in accordance with current procedures.

With regard to the topology shown in the interface 300 of FIG. 3, for example, the creator may desire to make the topology available to others for future implementations and may do so by testing and validating the topology. Upon successful testing and/or validation, the creator may designate the topology as certified. In certain embodiments, another user such as an administrator must approve of the certification before allowing other users to be notified of the certified status of the topology.

In certain embodiments, a user may create a topology manually by way of creating an XML file and then importing the XML, file using the topology creator interface 300, for example. Alternatively or in addition thereto, a user may export an XML file of a topology using the topology creator interface 300, edit the XML file manually, and then import the modified XML file by way of the interface 300, for example.

Once a topology is saved within the DTE framework, it is generally owned by its creator and, unless another user has been granted administrative privileges on the topology, only the creator may modify the topology. However, the topology may be made available for use by any registered DTE user. In situations where a certain user likes a particular topology but wants to customize it further, the user may clone the topology. The resulting cloned topology will thus be owned by the user who performed the cloning and can then be modified as needed by the user.

Figure 4:
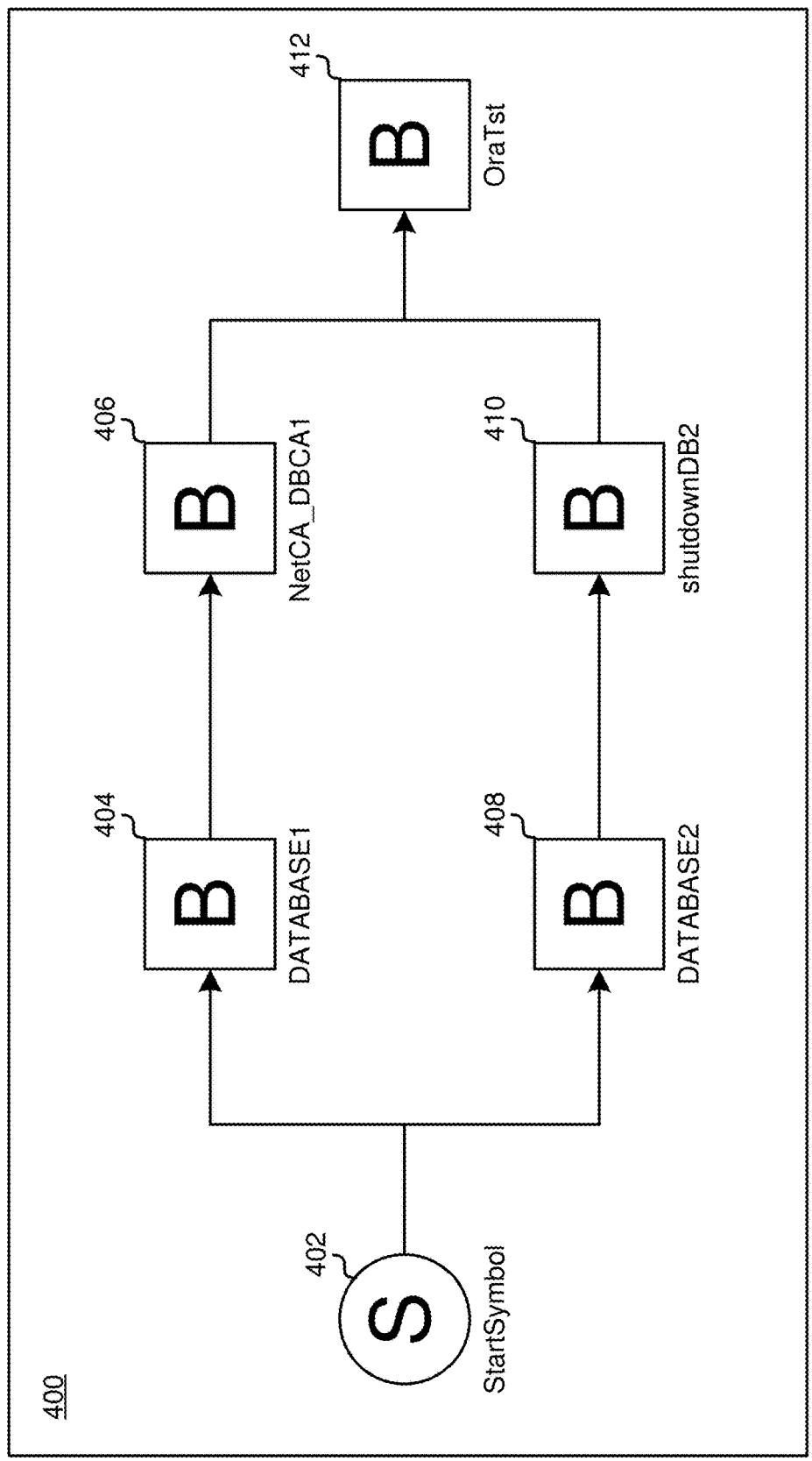
FIG. 4 illustrates an example of a topology editor interface in accordance with certain implementations of the disclosed technology.

FIG. 4 illustrates an example of a topology editor interface 400 in accordance with certain implementations of the disclosed technology. In the example, the topology editor interface 400 is presenting a topology that includes a starting module 402 and multiple building blocks 404-412, one of which (404) represents the DATABASE1 building block in the examples illustrated by FIGS. 2 and 3 and described above.

The topology editor interface 400 may present a number of features and options to the user. For example, the user may rearrange any or all of the building blocks 404-412. The user may also delete and/or clone any of the building blocks 404-412. For example, a DATABASE2 building block (408) may be a cloned version of the DATABASE1 building block (404) with (or without) modification. In certain embodiments, the user may import and/or export certain XML files to be used in connection with any of the building blocks 404-412.

In certain embodiments, a topology editor interface may offer the user with a standard look and feel while provide graphical representations of complex concepts such as inheritance of topologies. A topology editor may interact with a strong data structure that allows in-memory operations but is flexible enough to handle new requirements. The topology editor may also be adaptable for certain enhancements such as partial execution of topology.

In certain embodiments, the DTE framework may include a lightweight proxy listener written using the Perl interpreter, for example. If this listener is started on any associated machine, the DTE framework may communicate with the listener and perform the execution of a topology on that machine, regardless of how remote the machine may be.

The DTE framework may include a reporting mechanism for a topology. The reporting mechanism may consist of the status for each individual building block within the topology. For example, a certain database install block may have a routine that analyzes the install log generated by a certain install to determine whether the install succeeded or failed. The subsequent generation of a file with a particular extension (e.g., .suc or .dif) may be used to indicate in the report whether that particular task succeeded or failed.

A DTE engine may be used to execute topologies and create reports of executed tasks, for example. The DTE engine may be used to set up a topology in a distributed environment involving multiple systems that may involve multiple operating systems. The DTE engine may effectively act as a central console process though it does not need to be situated at or on any of the involved systems.

In certain embodiments, the DTE engine is programmed in Java. The DTE engine may also communicate with remote machines in implementations that include a DTE proxy listener, for example. In these embodiments, the DTE engine may communicate with the remote machine(s) over a TCP/IP network to perform the entire execution of a selected topology remotely, for example.

The DTE engine, which is also referred to as a DTE execution handler, in accordance with the DTE framework described herein may read and parse a topology definition file for a specific topology, ping the participating system(s) of the distributed environment and check the validity thereof, look for and analyze any building block dependencies in the topology definition, and process the building blocks in accordance with the execution order specified by the topology. The DTE engine may be characterized at least in part by the following pseudo-code:

```
• procedure TopologyProcessor (topology)
    retrieve topology information
    organize building blocks in order based on dependencies specified in
    topology
    call LocalTaskProcess for each block successively in order
• procedure LocalTaskProcess (machine, block)
    execute a single block on the specified machine
• procedure CreateHTMLReport (machine, block)
    summarize executed job based on sucs/difs
    write output to HTML file
• procedure Proxy (machine, port)
    start a listener on the specified machine using the provided port
    return status of the listener
```

An entire topology (or set of multiple topologies) may be executed on a single machine. In these embodiments, the building blocks of each topology are generally executed in the sequence specified by the topology.

In certain embodiments, the DTE framework may allow users to define sets of topologies, which will be referred to herein as toposets. When used in connection with a pool of machines, the topologies of a given toposet may all be executed simultaneously across different hardware resources. In these embodiments, which will typically include complex topologies and/or multiple topologies, building blocks of one or more of the topologies may be executed across multiple hosts, e.g., on different devices. Also, different building blocks of one or more of the topologies may be executed in parallel, subject to any dependencies specified by the topology or limitations presented by the device(s) on which the building blocks are executed. Development and testing teams may use toposets to conveniently organize multiple topologies.

Certain implementations of the DTE framework include a DTE log analysis module that may be used to determine the status of a particular task. The following is an example of pseudo-code implementing a DTE log analysis module:

```
procedure analyze_task_log
    if "success" string found in log file
        if exceptions or errors found in log file
            create .dif file
            return status = ACCEPTABLE
        else
            create .suc file
            return status = SUCCESS
    else
        create .dif file
        return status = FAILURE
```

A summary of the status for multiple tasks may be formulated into a report, such as an HTML report, which may be based on any .dif or .suc files created during analysis. A results archive may be used to store any or all generated reports. In certain embodiments, only some reports, such as critical logs, for example, are stored. Also, logs pertaining to an entire environment may be stored in a compressed file.

In certain embodiments, the DTE framework described herein may include a scheduler that users may use to have one or more specified topologies executed at specified time(s) and location(s). For example, a user may specify that a certain topology is to be executed on a particular machine at a designated time or, if the machine is unavailable at the desired time, then it should be executed on an assigned secondary device.

Figure 5:
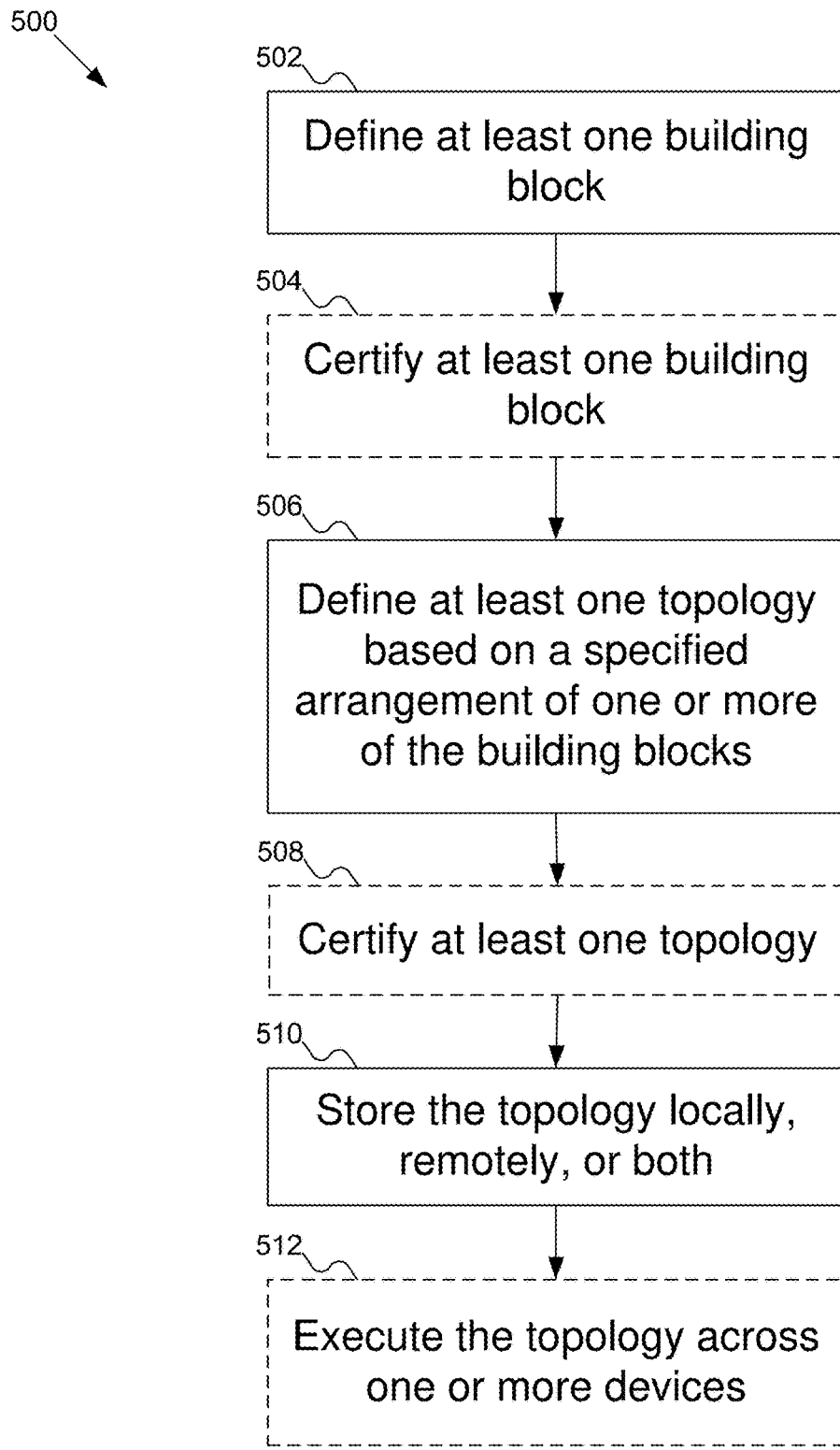
FIG. 5 illustrates an example of a method of managing building blocks and topologies in accordance with certain implementations of the disclosed technology.

FIG. 5 illustrates in example of a method 500 of managing building blocks and topologies in accordance with implementations of the disclosed technology. At 502, one or more building blocks are defined in accordance with any of the pertinent techniques described above. In an optional operation at 504, one or more building blocks may be certified. In certain embodiments, for example, a building block must be certified before it can be used in a topology or re-used by another user in another topology.

At 506, one or more topologies are defined in accordance with any of the corresponding techniques described above. For example, a user may use the topology creator interface 300 of FIG. 3 or the topology editor interface 400 of FIG. 4 to create a new topology or modify a previously-created topology. In an optional operation at 508, one or more topologies may be certified. In certain embodiments, for example, a topology must be certified before it can be executed or implemented in connection with other topologies, e.g., re-used by other users.

At 510, the one or more topologies may be stored locally, remotely, or both, e.g., in the data store 110 of FIG. 1. In an optional operation at 512, at least one topology is executed as directed by a user or scheduling mechanism, for example. A DTE engine, such as the engine 102 of FIG. 1, may execute the topology by executing each of the topology's building blocks in accordance with the specified sequence. The DTE engine may execute or cause to be executed the building blocks of the topology in sequence, in parallel, or both on the client machine 106, web server 104, and/or execution machines 108 of FIG. 1, for example.

Figure 6:
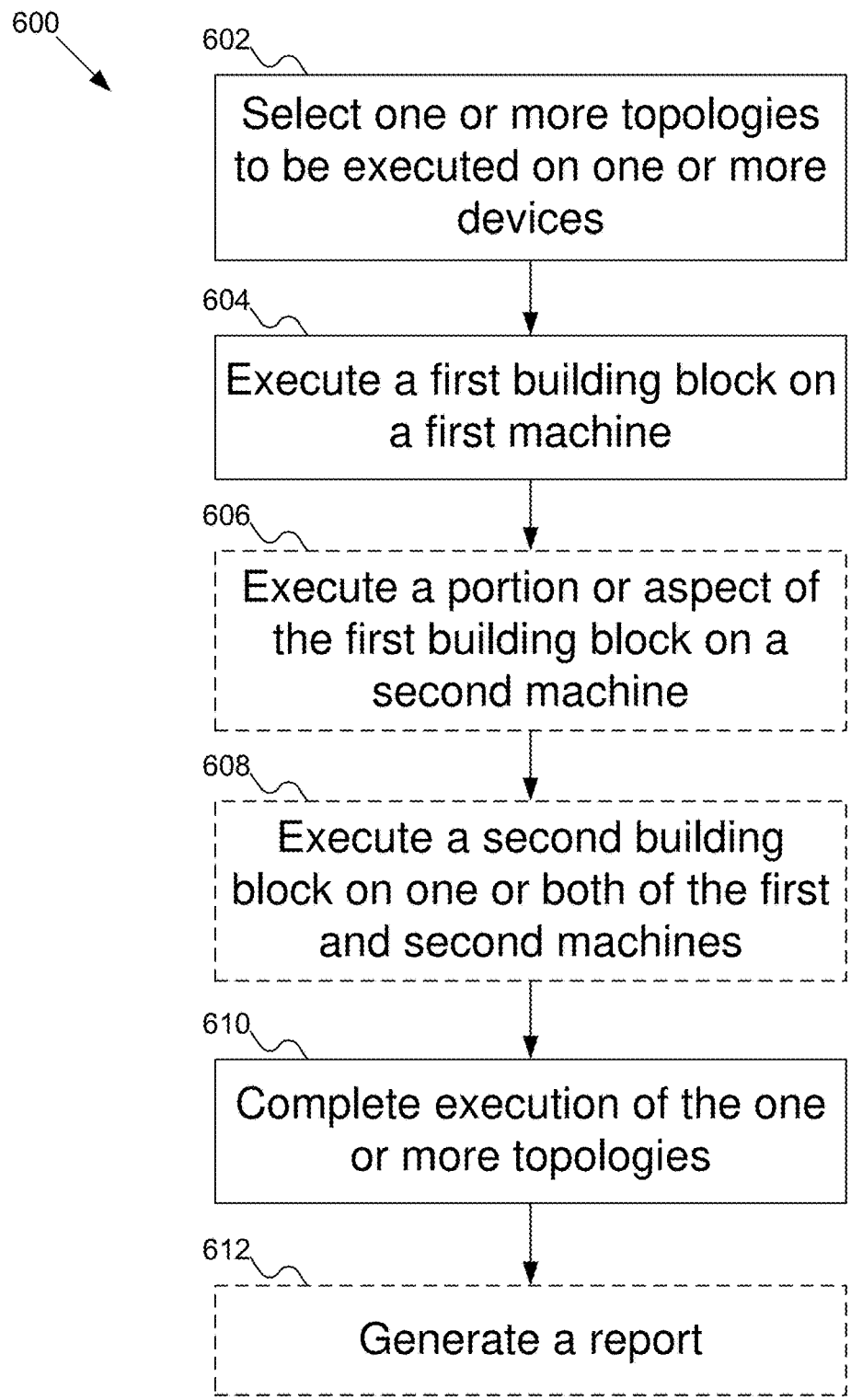
FIG. 6 illustrates an example of a method of executing a topology in accordance with certain implementations of the disclosed technology.

FIG. 6 illustrates an example of a method 600 of executing a topology in accordance with implementations of the disclosed technology. At 602, one or more topologies are selected for execution, e.g., by a user or scheduler. The one or more topologies are to be executed on one or more devices as specified by topology definitions, for example. At 604, a first building block is executed on a first device, e.g., machine.

In optional operations at 606 and 608, respectively, a sub-part of the first building block may be executed on a first machine and a second building block (or portion thereof) may be executed on one or both of the machines and/or on a third machine. The operations at 604-608 generally continue until the building blocks to be executed have either successfully completed or encountered an error or other reason for early termination.

At 610, the one or more topologies complete execution and, in an optional operation at 612, a report may be generated in accordance with the techniques described above. The report may be stored and/or sent to a particular destination, e.g., via email. In certain embodiments, the report may be generated during execution of one or more of the building blocks to be executed. In these embodiments, real-time status updates, including alerts and error messages, may be provided to the user and/or administrator. The generated report may be saved in a data store by itself or in connection with other reports and may be stored as a compressed file.

Software Research and Development usually involves multiple stacks of products and applications that collaborate together. Within this stack, different software may have dependency upon various other portions of the software stack, e.g., at the application level, source code, or library level. Implementations of the disclosed technology are generally directed to a framework for the validation of multiple hierarchical software products in a Continuous Integration model. Such implementations may advantageously address the following unfavorable situations: where a change in the source code of Product A may break validations of Product B that is dependent on Product A, thus preventing the continuous integration pipeline from proceeding; where a change in the source code of Product A may require a corresponding product or test change in Product B that depends on Product A but, without proper processes, could lead to a "Catch 22" situation; where interdependent products in the software stack are typically unaware of each other's changes, thus requiring a centralized module to coordinate continuous validation of changes across the board in all products.

Figure 7:
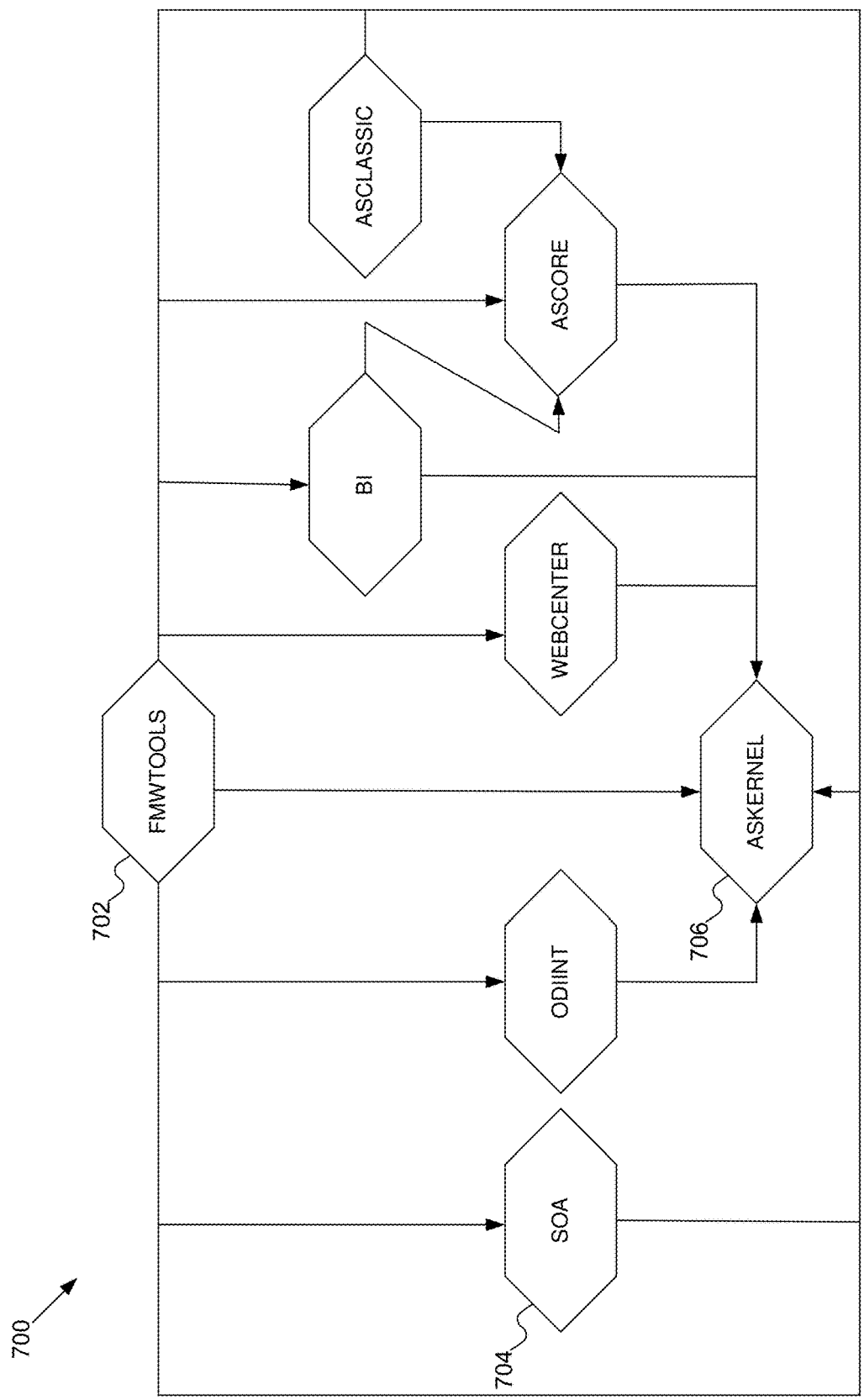
FIG. 7 illustrates an example of hierarchical software in accordance with certain implementations of the disclosed technology.

FIG. 7 illustrates an example of hierarchical software 700 in accordance with certain implementations of the disclosed technology. In the example, the hierarchical software 700 includes various products, such as an FMWTOOLS product 702 that depends on an SOA product 704, which depends on an ASKERNEL product 706. In the example, each product is separately version-controlled in a system that continuously accepts new source code check-in and validations.

Certain implementations may include a DTE Snapshot that is a Cloud Service which may be continuously refreshed from DTE's own version control system. A DTE Snapshot can generally be built at any time with a DTE Snapshot Builder Service. This utility may read product/release pairs as input parameters and generate a structure for all the DTE Topologies of the named product/release as demonstrated by the screenshot 800 illustrated by FIG. 8. In the example, the ".dte_snapshot" file refers to a property indicator, recording the snapshot generation timestamp, owner, and specified DTE product and release. The DTE directory contains the execution scripts and supporting files for all of the topologies of product "foo" and release "bar". The "database" directory contains definitions of all the topologies of product "foo" and release "bar" in XML, format.

When a user provides a snapshot to a DTE job submission, the DTE Job Submission module may fetch all of the definitions and scripts from the snapshot instead of from the DTE database and version control system. This advantageously allows users to utilize an exact version of the Executor for Software Configuration Automation at any given point in time.

For Continuous Integration Workflow, multiple levels of validation can be defined based on the required granularity. For example, component-level validation may be used to validate each product's own change against all the products' MATS that may be affected based on the inter-dependency of products validation, and integration-level validation, which merges all the products' change at given time intervals, may be used to test validations at each product level, thus addressing potential conflicts between changes of different products when they are integrated together.

Product changes are generally released only if both validation levels pass. The DTE Snapshot, which is generally driven by the DTE engine for executing all of the product test validations, may serve as the central coordinator to continuously orchestrate all of the products' new changes and dependencies. The validations may be performed on a temporary test environment built using the last known set of approved product pieces together with the new product changes being validated.

Figure 9:
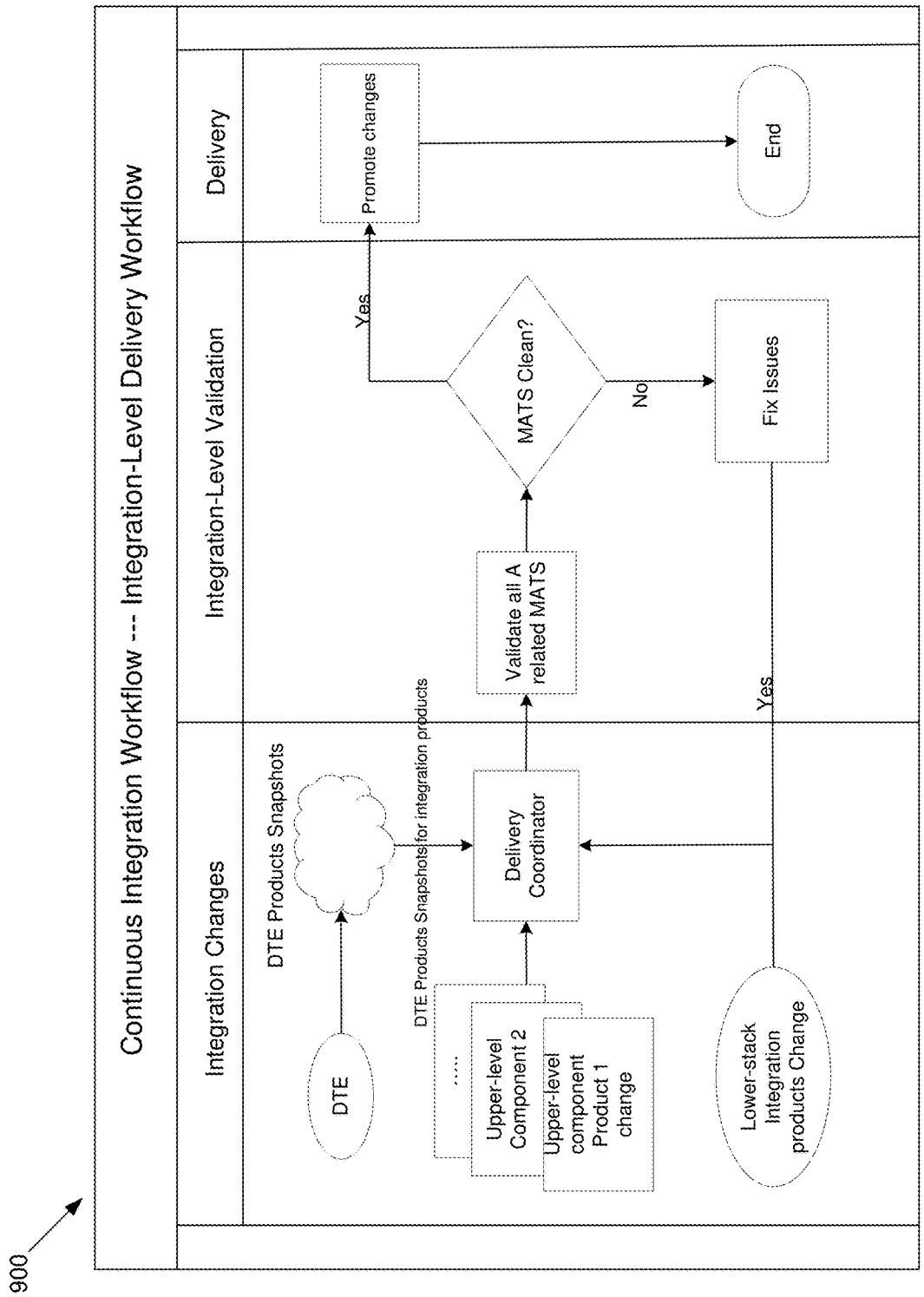
FIG. 9 illustrates an example of an integration-level validation workflow in accordance with certain implementations of the disclosed technology.

FIG. 9 illustrates an example of an integration-level validation workflow 900 in accordance with certain implementations of the disclosed technology. In the example 900, both validation levels pass so the changes are promoted.

Figure 10:
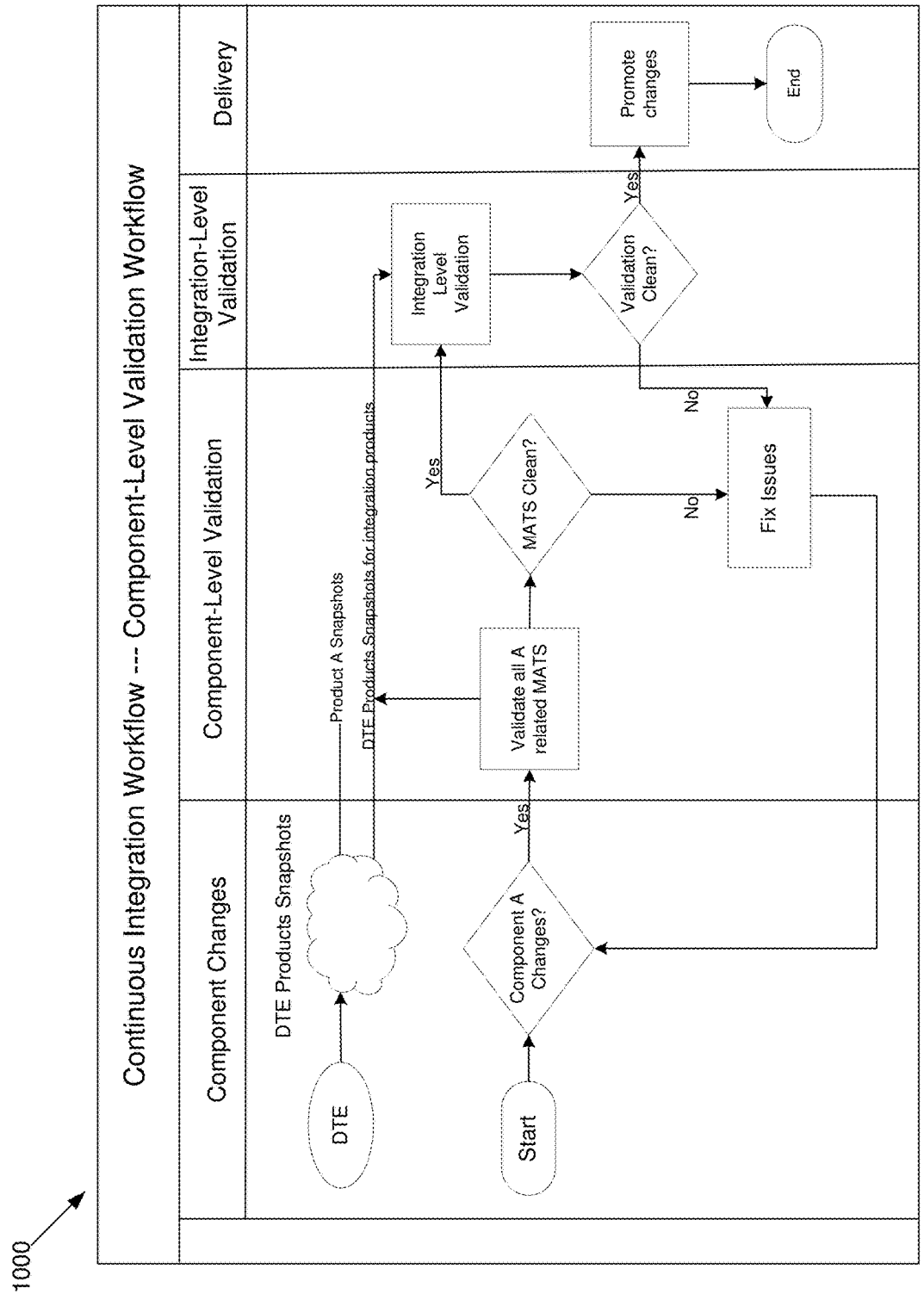
FIG. 10 illustrates a first example of a component-level validation workflow in accordance with certain implementations of the disclosed technology.

FIG. 10 illustrates a first example of a component-level validation workflow 1000 in accordance with certain implementations of the disclosed technology. In the example 1000, in which there is only a single component product change, the validation levels pass so the changes are promoted.

Figure 11:
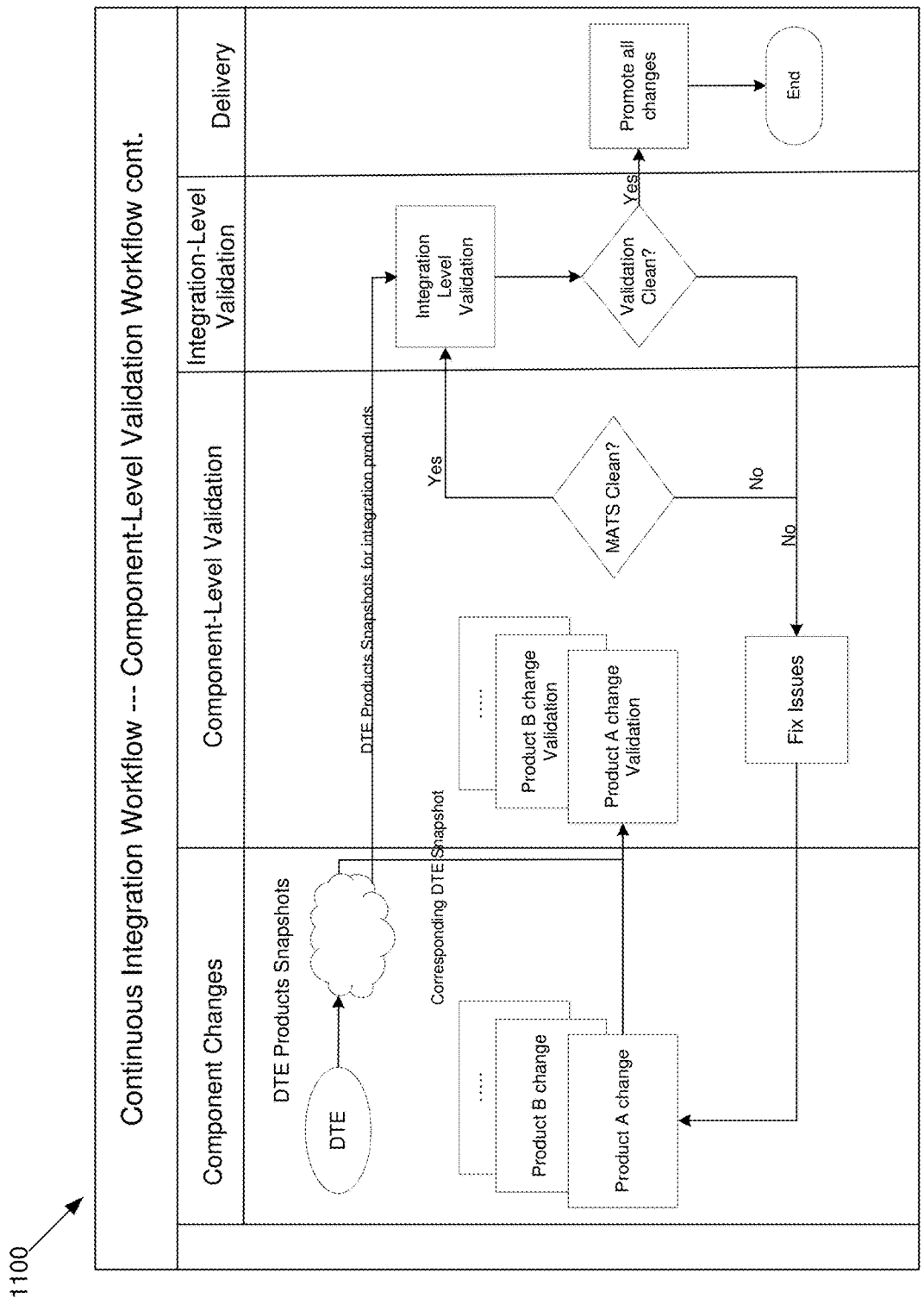
FIG. 11 illustrates a second example of a component-level validation workflow in accordance with certain implementations of the disclosed technology.

FIG. 11 illustrates a second example of a component-level validation workflow 1100 in accordance with certain implementations of the disclosed technology. In the example 1100, in which there are multiple component product changes, the validation levels still pass so all of the changes are promoted.

The following is an abstract of the pseudocode for an embodiment in which a Product A is the basis of a Product B, and Product A and Product B both have code changes requiring approval:

component-level validation of Product A for Product A's code change from its own version control system:
    trigger Product A's tests using the new version of Product A's source code and the DTE Snapshot of Product A;
    trigger product B's MATS against product A's DTE snapshot and changed code;
    if tests pass:
        code change advances to Integration level validation
component-level validation of Product B, for Product B's code change from its own version control system:
    trigger Product B's tests against the new version of Product B's source code and the DTE snapshot of Product B;
    if tests pass:
        code change advances to integration level validation
integration-level validation of Product A and Product B together:
    for both Product A and Product B's code change from each version control system:
        trigger Product A and Product B's MATS against Product A's DTE snapshot and both products' changed code;
        trigger Product A and Product B's MATS against Product B's DTE snapshot and both products' changed code;
        If tests pass:
            code change has passed all the validation and can be promoted;

So, in situations where the component-level validations may fail, the product source code changes will desirably not be released. Further, other products will not be impacted since they generally only use the latest validated source code for each product. Since only the relevant tests are typically executed based on knowledge of the hierarchy, this service may significantly improve the product release cycle in the areas of both stability and velocity of promotion.

Figure 12:
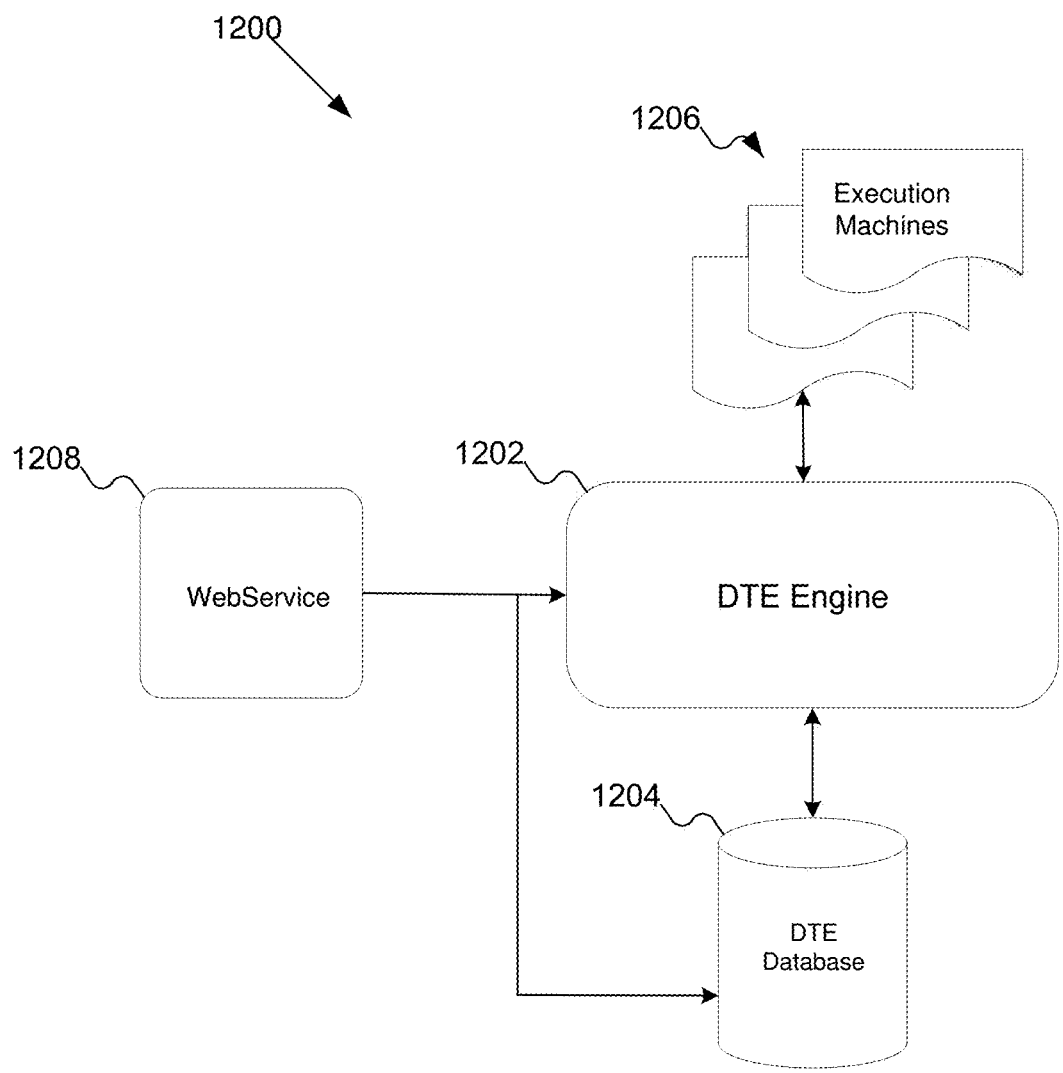
FIG. 12 illustrates an example of a DTE system in accordance with certain implementations of the disclosed technology.

FIG. 12 illustrates an example of a DTE system 1200 in accordance with certain implementations of the disclosed technology. In the example, the system 1200 includes a DTE engine 1202, a DTE database 1204, one or more execution machines 1206, and a WebService 1208 configured to communicate with the DTE engine 1202.

Figure 13:
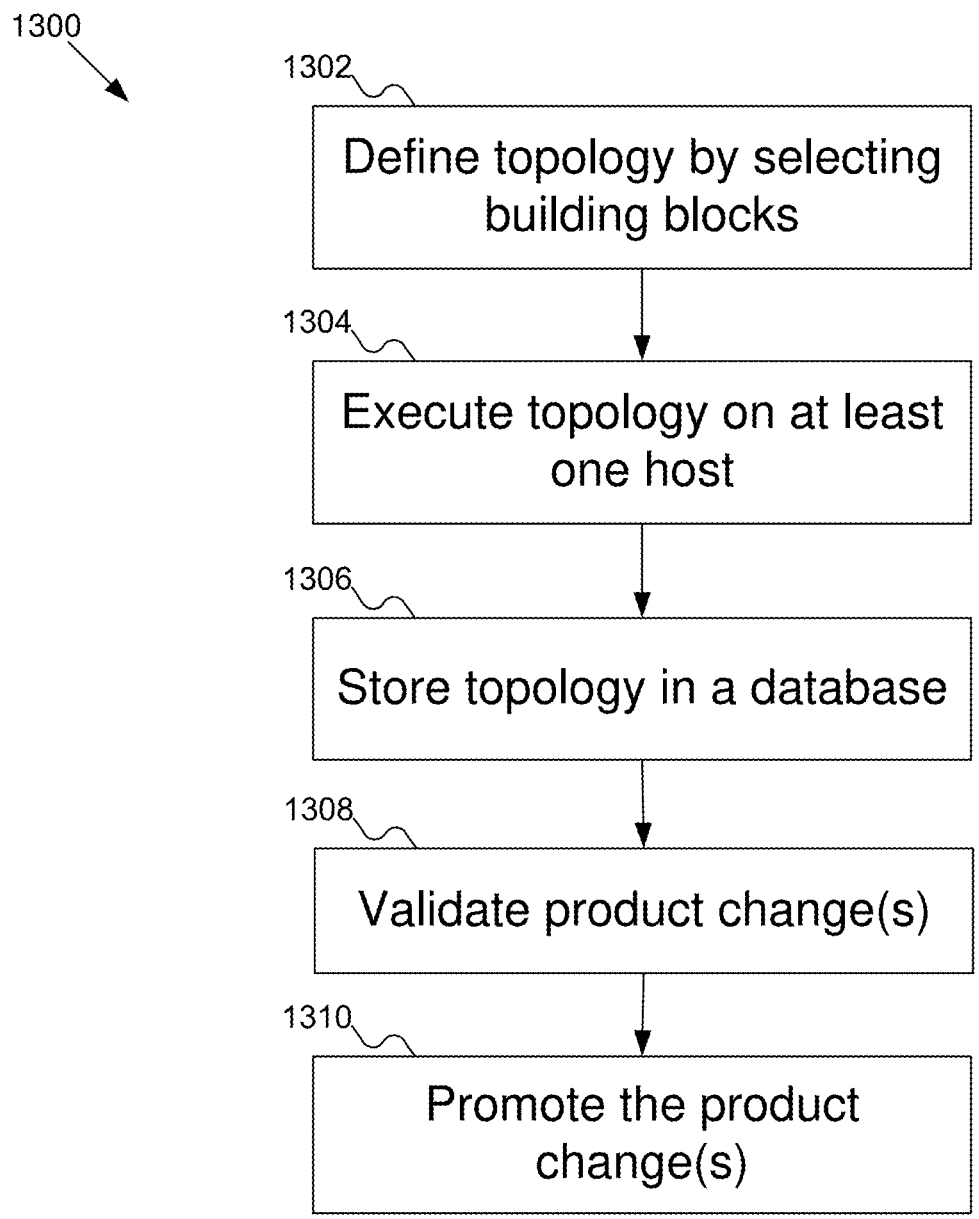
FIG. 13 illustrates an example of a method of validating a product change in accordance with certain implementations of the disclosed technology.

FIG. 13 illustrates an example of a method 1300 of validating a product change in accordance with certain implementations of the disclosed technology. At 1302, a topology is defined by way of the selecting of one or more building blocks, each building block including a set of instructions pertaining to a particular application.

At 1304, the topology is executed on at least one host by way of executing the building block(s) on the host(s). At 1306, the topology is saved, e.g., by a topology database.

At 1308, one or more product changes are validated. The validating may include a component-level validation, an integration-level validation, or both. At 1310, the product change(s) are promoted responsive to a successful validation at 1308.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines may include computing devices such as personal computers, workstations, servers, portable computers, handheld devices, tablet devices, and the like.

Typically, a machine includes a system bus to which processors, memory such as random access memory (RAM), read-only memory (ROM), and other state-preserving medium, storage devices, a video interface, and input/output interface ports can be attached. The machine may also include embedded controllers such as programmable or non-programmable logic devices or arrays, Application Specific Integrated Circuits (ASICs), embedded computers, smart cards, and the like. The machine may be controlled, at least in part, by input from conventional input devices such as keyboards and mice, as well as by directives received from another machine, interaction with a virtual reality (VR) environment, biometric feedback, or other pertinent input.

The machine may utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology may be described by reference to or in conjunction with associated data including functions, procedures, data structures, application programs, instructions, etc. that, when accessed by a machine, may result in the machine performing tasks or defining abstract data types or low-level hardware contexts. Associated data may be stored in, for example, volatile and/or non-volatile memory, such as RAM and ROM, or in other storage devices and their associated storage media, which can include hard-drives, floppy-disks, optical storage, tapes, flash memory, memory sticks, digital video disks, biological storage, and other non-transitory, physical storage media.

Associated data may be delivered over transmission environments, including the physical and/or logical network, in the form of packets, serial data, parallel data, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

We claim:
1. A distributed topology system, comprising:
    a distributed topology engine configured to run on a server device and define a topology comprising a plurality of building blocks, each building block representing at least one task pertaining to an application;

a distributed topology application configured to run on a client device and automatically execute at least one of the plurality of building blocks;

a distributed topology database configured to store the topology; and a continuous integration module configured to validate at least one product change and, responsive to a successful validation, promote the at least one product change;

wherein the validation includes a component-level validation and an integration-level validation;

wherein the continuous integration module is configured to, responsive to the successful component-level and integration-level validation, promote the at least one product change to the product.

2. The distributed topology system of claim 1, further comprising a reporting mechanism configured to provide a status of each of the plurality of building blocks.

3. The distributed topology system of claim 1, wherein the distributed topology engine is further configured to execute the topology.

4. The distributed topology system of claim 3, wherein the distributed topology engine is further configured to create reports of executed tasks within the executed topology.

5. The distributed topology system of claim 4, wherein the reports include real-time status updates including alerts and error messages.

6. The distributed topology system of claim 1, wherein the topology is stored locally.

7. The distributed topology system of claim 1, wherein the topology is stored remotely.

8. A computer-implemented method, comprising:

defining a topology by selecting a plurality of building blocks, wherein each of the plurality of building blocks comprises a set of instructions pertaining to a particular application, and wherein the defining is based on at least one specification pertaining to an environment;

executing the topology on at least one host by executing the plurality of building blocks on the at least one host;

storing the topology in a database;

validating at least one product change;

responsive to a successful validation, promoting the at least one product change;

wherein the validating includes a component-level validation and an integration-level validation; and promoting the at least one product change to the product responsive to the successful component-level and integration-level validation.

9. The computer-implemented method of claim 8, further comprising a reporting mechanism providing a status of each of the plurality of building blocks.

10. The computer-implemented method of claim 8, further comprising the distributed topology engine creating reports of executed tasks within the executed topology.

11. The computer-implemented method of claim 10, wherein the reports include real-time status updates including alerts and error messages.

12. The computer-implemented method of claim 8, wherein the storing comprising storing the topology locally.

13. The computer-implemented method of claim 8, wherein the storing comprising storing the topology remotely.

14. One or more non-transitory computer-readable media storing instructions that, when executed by a processor, cause the processor to perform a method comprising:

defining a topology by selecting a plurality of building blocks, wherein each of the plurality of building blocks comprises a set of instructions pertaining to a particular application, and wherein the defining is based on at least one specification pertaining to an environment;

certifying at least one of the plurality of building blocks;

executing the topology on at least one host by executing the plurality of building blocks on the at least one host;

validating at least one product change; and responsive to a successful validation, promoting the at least one product change;

wherein the validating includes a component-level validation and an integration-level validation;

wherein the method includes promoting the at least one product change to the product responsive to the successful component-level and integration-level validation.

15. The one or more non-transitory computer-readable media of claim 14, wherein the method includes providing a status of each of the plurality of building blocks.

16. The one or more non-transitory computer-readable media of claim 14, wherein the method includes creating reports of executed tasks within the executed topology.

17. The one or more non-transitory computer-readable media of claim 16, wherein the reports include real-time status updates including alerts and error messages.

18. The one or more non-transitory computer-readable media of claim 14, wherein the method includes storing the topology.

19. The one or more non-transitory computer-readable media of claim 18, wherein the storing includes storing the topology locally.

20. The one or more non-transitory computer-readable media of claim 18, wherein the storing includes storing the topology remotely.

* * * * *

UNITED STATES PATENT AND TRADEMARK OFFICE
CERTIFICATE OF CORRECTION

PATENT NO. : 10,243,804 B2
APPLICATION NO. : 15/445676
DATED : March 26, 2019
INVENTOR(S) : Poonen et al.

Page 1 of 1

It is certified that error appears in the above-identified patent and that said Letters Patent is hereby corrected as shown below:

In the Specification

In Column 4, Line 36, delete "XML," and insert -- XML --, therefor.

In Column 6, Line 37, delete "XML," and insert -- XML --, therefor.

In Column 10, Line 19, delete "XML," and insert -- XML --, therefor.

Signed and Sealed this
Third Day of November, 2020

Andrei Iancu
*Director of the United States Patent and Trademark Office*